A. C. JONES.
BUTTON MAKING MACHINE.
APPLICATION FILED NOV. 11, 1905.
938,150.
Patented Oct. 26, 1909.
4 SHEETS—SHEET 4.
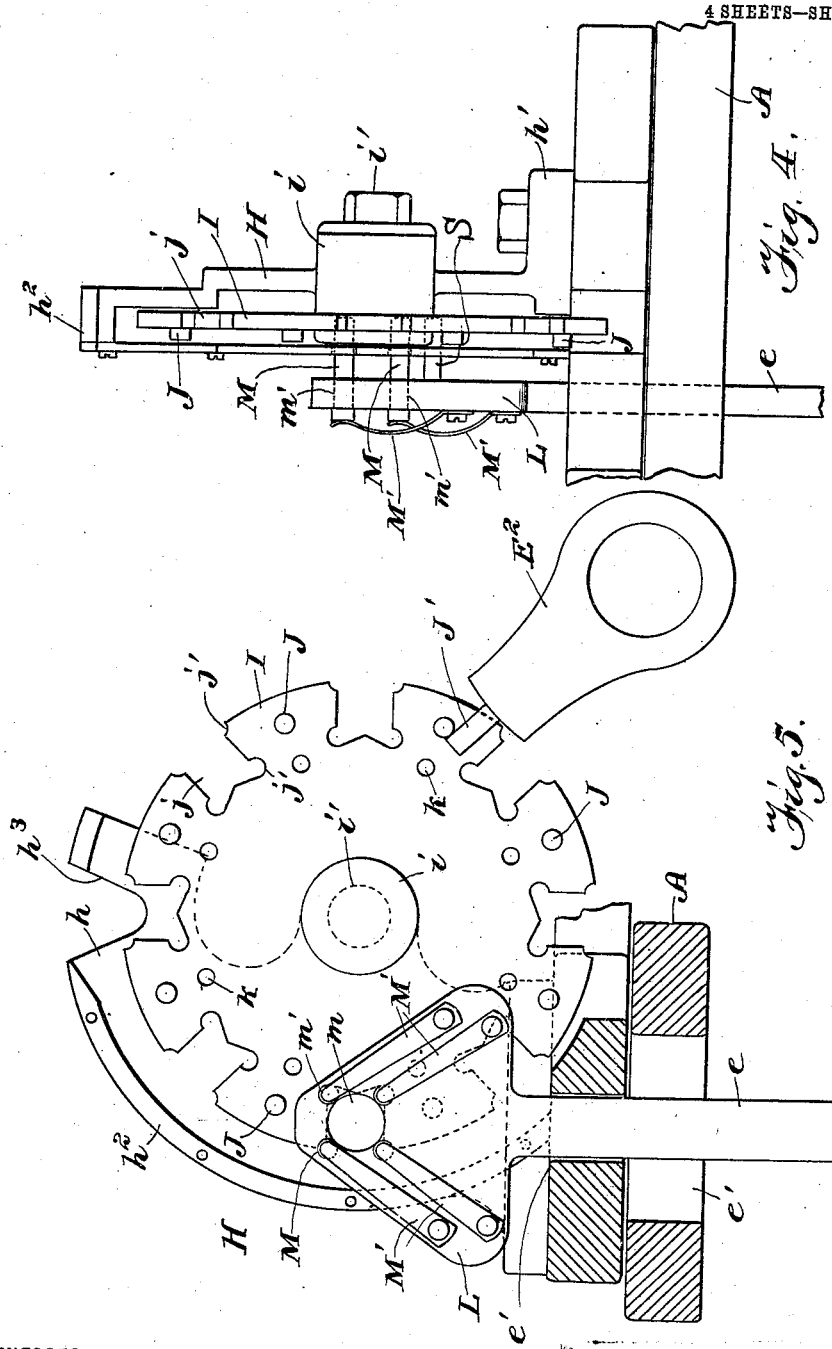
WITNESSES:
Robart Head
V. E. Nichols
INVENTOR
Albeno C. Jones,
BY
Griffins Bernhard
ATTORNEYS

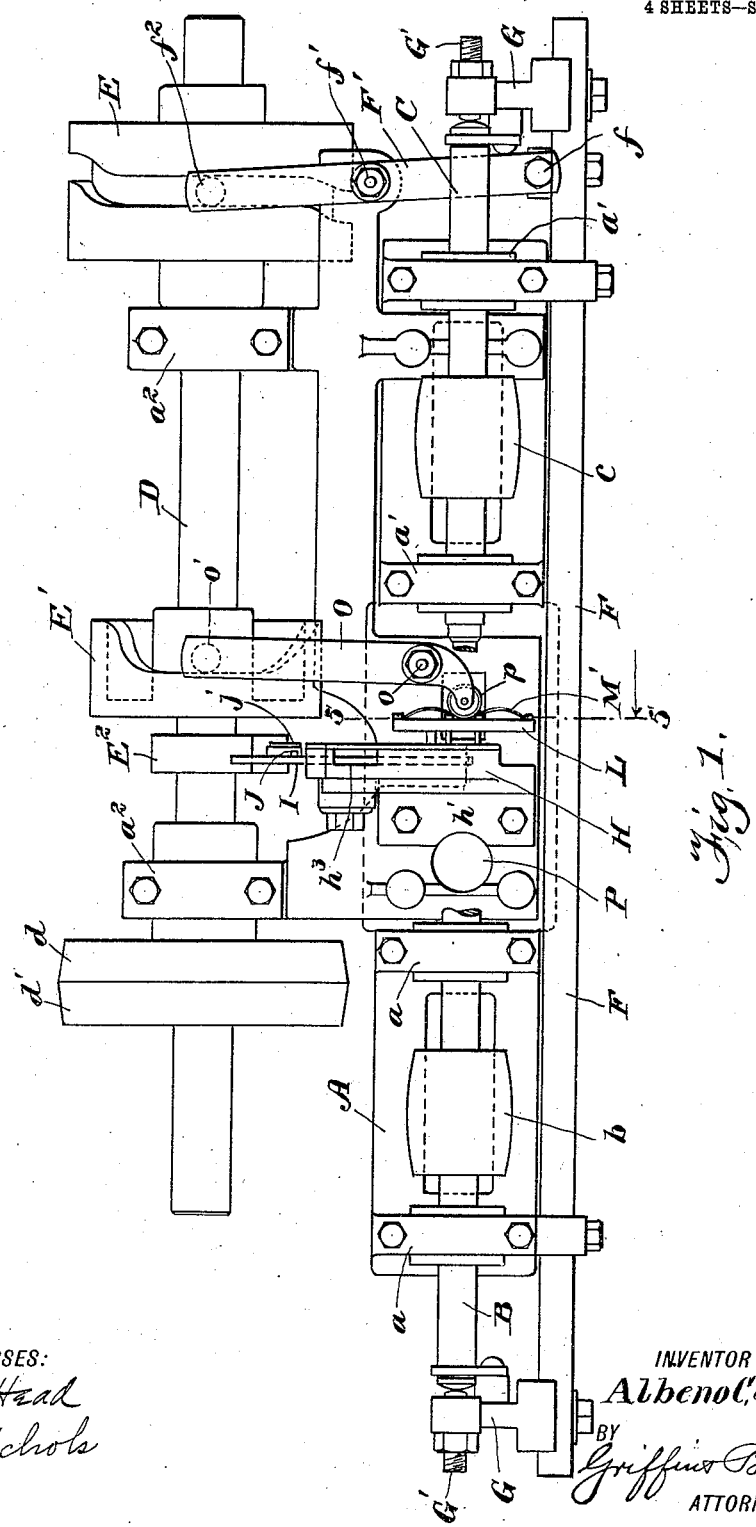

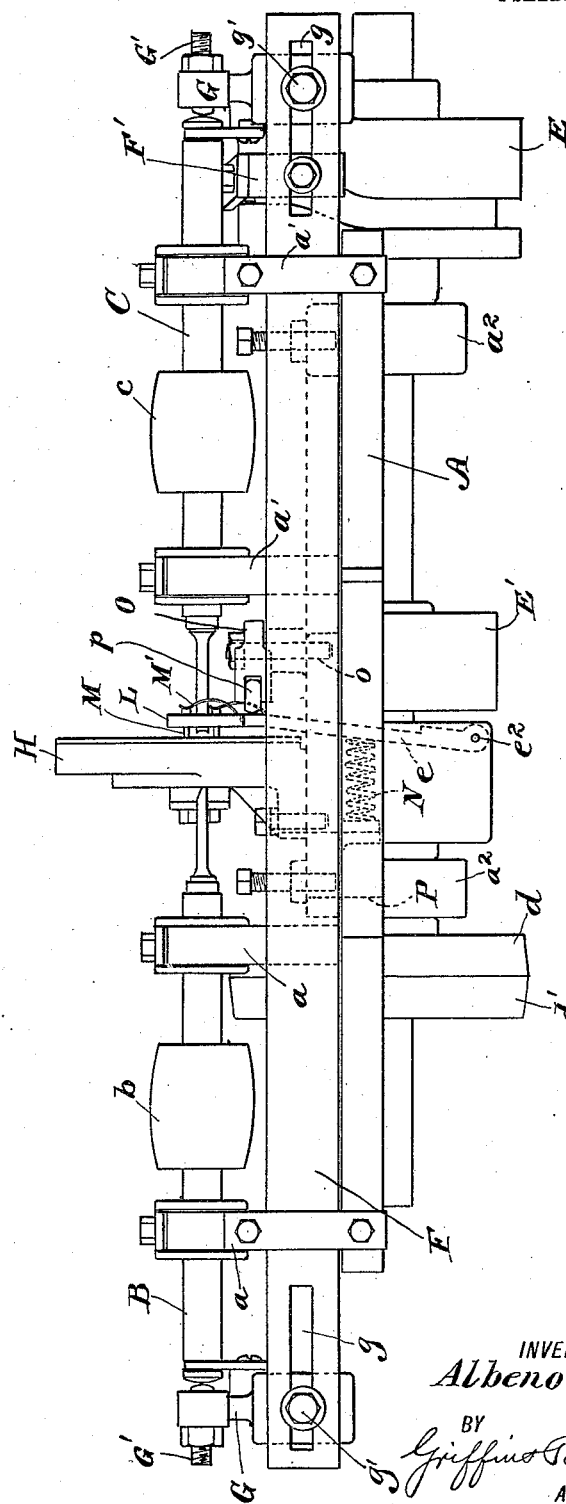

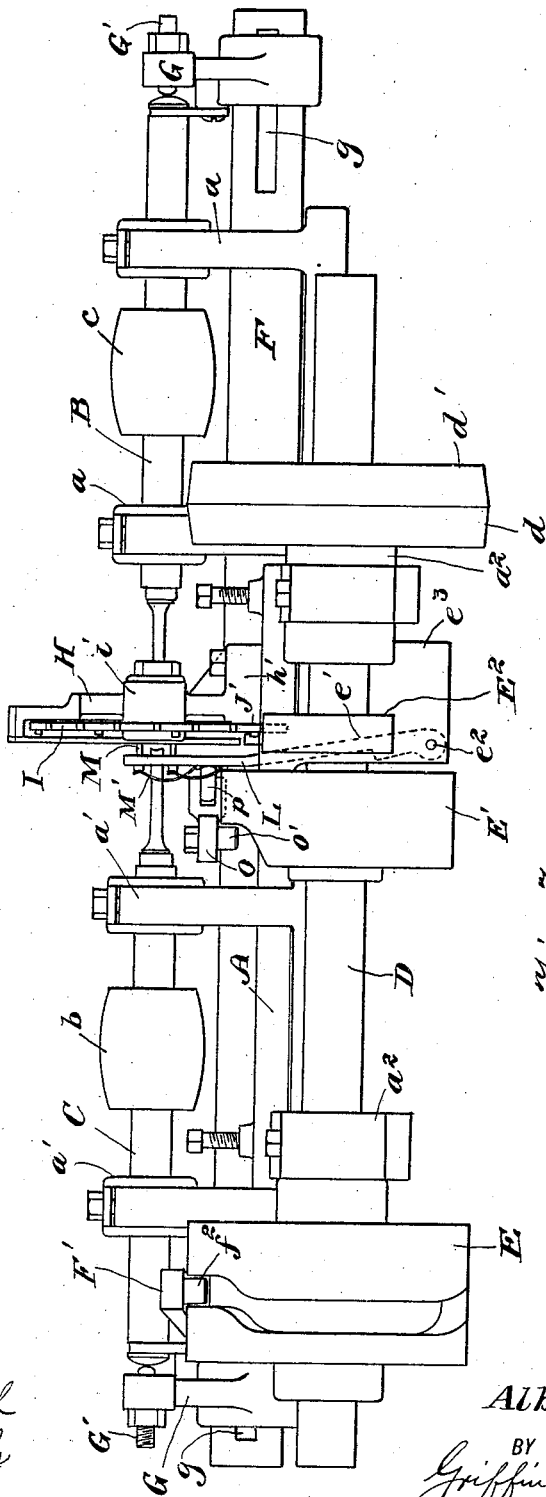

UNITED STATES PATENT OFFICE.

ALBENO CHARLES JONES, OF SENECA FALLS, NEW YORK.

BUTTON-MAKING MACHINE.

938,150. Specification of Letters Patent. Patented Oct. 26, 1909.

Application filed November 11, 1905. Serial No. 286,815.

*To all whom it may concern:*

Be it known that I, ALBENO CHARLES JONES, a citizen of the Kingdom of Great Britain, residing at Seneca Falls, in the county of Seneca and State of New York, have invented certain new and useful Improvements in Button-Making Machines, of which the following is a specification.

This invention is a machine for making buttons, wherein a suitable material, such as the substance known as "vegetable ivory", is treated by cutting the front, back and edge so as to produce a finished product.

According to the present invention, the stock is adapted to be supplied in any suitable way to an automatic feed mechanism which operates to carry the pieces of stock successively to means for holding the material in position for the operations of cutting, trimming or finishing the front, back and edge of the article. Said feed mechanism in one embodiment of the invention contemplates a revoluble carrier provided with a plurality of peripheral pockets adapted for the reception of the pieces of stock. With this carrier coöperates means for moving the same with a step by step movement, such means being actuated automatically from one of the machine shafts.

The machine has two cutter spindles adapted for rotary movement and for endwise adjustment, one of said spindles having means for cutting or trimming the face of the stock or blank, and the other spindle being equipped with means for cutting the back and edge of the blank so as to finish the latter. The two cutter-spindles are adjusted by automatic devices so as to present them alternately into coöperative relation to the stock or blank under treatment.

The stock which is under the treatment of one cutter or the other is gripped by and between a group of fingers which is carried by a holder, the latter being movable relative to the carrier of the feed mechanism. The fingers of the group are in the form of pins mounted slidably in the holder, and these pins are spring actuated so as to make them movable in the holder. It is preferred to make the holder movable laterally with respect to the carrier, and to this end said holder is pivoted to the machine frame so that it may be moved in one direction by a suitable retractor, such as a spring, while it is adapted to be moved in an opposite direction from a cam on one shaft of the machine, said cam acting through an intermediate lever.

Reference is to be had to the accompanying drawings, forming a part of this specification, wherein like characters of reference are used to indicate corresponding parts in all the figures of the drawings.

Figure 1 is a plan view of a button making machine embodying my invention, the adjacent ends of the cutter spindles being broken away, in order to show certain parts of the feed mechanism and the holder for the pieces of stock or material; Fig. 2 is a front elevation of the machine; Fig. 3 is a rear elevation of said machine; Fig. 4 is an edge view on an enlarged scale of the feed mechanism and the movable holder for the stock or material; Fig. 5 is a sectional elevation of the parts shown by Fig. 4, a section being taken through the bed of the machine, and the feed devices being viewed from the left hand side of Fig. 4.

The machine has a bed plate or main frame A, which is equipped with the pillow blocks $a$, $a$, $a'$, $a'$, said bed plate being also provided with rearwardly extending arms $a^2$. In the pillow blocks $a\ a$, is journaled a cutter spindle B, while in the pillow blocks $a'\ a'$ is another cutter spindle C. As shown, the two cutter spindles B, C, are in axial alinement longitudinally of the machine, the adjacent ends of said spindles being separated for a suitable distance so as to leave space for the accommodation of the feed and holder devices, and also to allow for the required endwise adjustment of said spindles. The spindles B, C, are provided with pulleys $b$, $c$, respectively, said pulleys accommodating suitable driving belts, not shown, whereby the spindles are adapted to be driven at a high rate of speed. The spindle B is provided or equipped with one form of cutter which is adapted to cut or trim the front of a button blank or piece of stock, so as to impart the desired finish thereto, while the other spindle C is equipped with a cutter device, which is constructed for the purpose of cutting or trimming the back and edge of the blank; but as these cutter devices form no part of the present invention, and may be of any suitable type known to the art, it is not considered necessary to illustrate or describe said cutters in detail in this application.

The spindles B, C, are mounted in their bearings to have rotary motion imparted thereto by the pulleys, and to be capable of a limited endwise movement or adjustment when it is desired to present one spindle in operative relation to the blank or stock and to withdraw the other spindle from said blank or stock.

The arms $a^2$ of the bed plate or frame afford bearings for a cam shaft D, the latter being arranged, preferably, at the rear side of the machine and occupying a position parallel to the two cutter spindles. Said shaft is provided with a fast pulley $d$, and a loose pulley $d'$. The shaft carries a plurality of cams, one of which is indicated at E, for the operation of the shipping means for the cutter spindle. Another cam E' is provided on the shaft D, for the operation of means whereby the blank holder is positively moved with respect to the carrier on the feed mechanism, while a third cam $E^2$ operates means for giving a step by step movement to the revoluble carrier of said stock feeding mechanism, all of which will be hereinafter explained in detail.

The means for simultaneously moving the two cutter spindles B, C, includes a shipper bar F, which extends longitudinally of the machine and is mounted on the bed plate A, so as to have endwise movement thereon. This bar F is connected to a lever F' by a pivotal bolt $f$, and said lever is fulcrumed at $f'$ on the bed A, the free end of the lever being provided with a roller or stud $f^2$, indicated by dotted lines in Fig. 1, and arranged to ride in a peripheral groove of the cam E. It is evident that the lever F' is acted on by the cam E, so as to move the shipper bar F, first in one direction, and then in the other direction, at proper intervals. Said shipper bar is provided with longitudinal slots $g$ at the end portions thereof, and through these slots pass bolts $g'$, which fasten the arms G adjustably to said shipper bar. The arms project from the bar across the end portions of the cutter spindles B, C, and said arms carry adjusting screws G', which are adapted for engagement with the opposite ends of the cutter spindles B, C, whereby the shipper bar is operatively related to said cutter spindles for the purpose of moving them endwise, as required in the operation of the machine.

H designates a housing which as shown consists of a plate $h$, provided with a base flange $h'$, and with a curved guard flange $h^2$, the whole being cast, preferably, in a single piece of metal. This housing is placed in an upright position on the bed plate and between the cutters on the adjacent ends of the two spindles B, C, said flange $h'$ of the housing being firmly secured to said bed plate, in order that the housing may occupy a stationary position. The housing is provided with a boss $i$, which constitutes a bearing for a stub shaft or axle $i'$ of a revoluble carrier I, the latter forming one element of the feed mechanism for the stock or material. This carrier I is in the form of a disk or plate, which is mounted on the shaft or axle $i'$, so as to have rotary movement with respect to the housing H, a portion of said carrier I being adjacent to the guard $h^2$ of the housing. Said carrier is provided with a plurality of pockets $j$, the same being formed in the periphery of the carrier, each pocket being of suitable form and capacity to receive one piece of stock or a blank to be operated upon in the machine. As shown by Fig. 5, each pocket has a notch $j'$ at the several corners thereof, said pockets being placed at suitable intervals around the peripheral portion of the carrier I. The casing or housing H is provided with a notch $h^3$, which is adapted to receive the blanks or pieces of stock intended to be placed by hand in the path of the carrier, and this notch of the housing is so related to the carrier that the blanks may pass from the notch into the pockets of the carrier, as will be understood by reference to Fig. 5. As a means for moving the carrier I, at the required intervals, I provide the studs or pins J, the same being placed between the pockets $j$, and projecting from one side or face of the carrier. The cam $E^2$ has a finger J', which projects from said cam and is adapted to engage with the studs J, successively. This cam rotates at the required speed, so as to make the finger J' operate on one stud J in the path thereof, thus moving the carrier for a distance equivalent to the space between the pockets $j$. The carrier is furthermore provided with openings $k$, the same corresponding in number to the studs J, and being provided in said carrier within the circle of the studs J and the pockets $j$, for a purpose to be hereinafter described.

For the purpose of holding the stock or material while it is under the treatment of the respective cutters on the two spindles B, C, there is provided means for holding or gripping said stock, substantially as shown by Figs. 4 and 5 of the drawings. Said holding means consists of a carrier L, and a group of members M, together with means for moving the carrier and said members sidewise with respect to the revoluble feeder I. The carrier L is shown by Fig. 5 as a substantially triangular plate, the latter being provided with a shank $e$, adapted to pass through suitable openings $e'$ in the bed or frame of the machine. The lower end of said shank $e$ is pivoted at $e^2$ to the bed plate, or to a depending lug $e^3$ of said bed plate, see Fig. 3. Said carrier L is smaller than the housing H, and the feeder I, said carrier being disposed to lie alongside of said parts. This carrier is provided, near its upper corner, with an opening $m$, and it is also provided with a plurality of transverse openings $m'$, the latter being disposed at proper intervals around the larger opening $m$. The grippers or members M are shown as pins which are fitted loosely in the openings $m'$, said pins being adapted to slide in said openings, each pin being long enough to extend through the carrier L, as shown by Fig. 4. Each gripper or pin is pressed normally toward the feeder I by any suitable kind of spring, such as the leaf spring M', the latter being fastened to the carrier L, said springs being arranged to act against the outer ends of the pins. As shown by the drawings, the grippers or members M are grouped around the openings $m$ of the carrier so as to be opposite to the notches $j'$ in the feeder I, and said pins or members are adapted to engage with the corner portions of the stock or material contained in one of the pockets of said feeder, whereby the members M coöperate with the feeder I in holding the stock in place while the latter is exposed to the action of the cutters on the spindles B, C.

The members M are yieldable individually in the carrier L, for the purpose of making said members adjust themselves automatically to the thickness of the stock or material. This is an important feature of my new feed mechanism, because each piece of stock may, and in practice does, vary in thickness at different parts thereof, and by making the members of the group operate independently of each other, in gripping a single piece of material, said members are adapted to have engagement properly with a single piece of stock which may vary in thickness, whereby the stock is adapted to be held against movement when the cutters act thereon.

The feeder I is adapted to be locked against movement while the cutters are acting on the stock, by a stud or pin S, the latter being on the carrier L (see Figs. 4 and 5), and said pin being adapted to enter one or the other of the series of apertures $k$ in the feeder I.

By pivoting the shank of the carrier L to the machine frame, said carrier is adapted to have a sufficient range of movement given thereto for withdrawing the members M from the path of the feeder, and also for withdrawing the locking stud S from an opening $k$ of said feeder. Against the shank of this carrier operates a suitable tension device or retractor, indicated in Fig. 2, by dotted lines, as a coiled spring N. Said spring is seated against a suitable part of a machine frame, and it acts on the shank of the carrier in a direction to force the latter normally away from the feeder, and thereby withdraw the members M from the stock or material, and also disengage the stud S from the feeder. For holding the carrier and the grippers in proper relation to the work or stock while it is under treatment by the cutters, and to hold the stud S in locking engagement with the feeder, I employ means for positively moving the carrier, the grippers, and the locking stud toward the feeder, said means acting in opposition to the tension of the retractor or spring N. The means which I prefer to employ for thus positively actuating the carrier L, consists of a lever O, which is pivoted at a point intermediate of its length to the bed plate, or machine frame, by a bolt $o$. One end of this lever has a shoe $o'$, adapted to act against the cam E', while the other end of said lever O is provided with a friction shoe or roller $p$, the latter being arranged to ride against the carrier L, and to force it toward the feeder, see Fig. 1.

The casing or housing H is provided with an opening, the latter being in line with the opening $m$ of the carrier L, and through this opening of the casing is adapted to be inserted and withdrawn the cutter on one of the spindles. The button blank after having been cut in the machine may drop by gravity through a suitable opening or openings provided in the bed or frame of the machine, one of said openings being shown at P by Fig. 1, whereby the button blanks are adapted to be delivered automatically from the machine, and into a suitable receptacle which should be placed below the machine bed.

In the operation of my machine, the spindles B, C, and their respective cutters, are driven at the required speed. The pieces of stock or material are inserted by an operator, through the notch $h^3$ of the housing H, into the pockets $j$ of the feeder J, the stock being placed successively in the pockets on the rotation of said feeder. The operation of the cam E on the feeder I rotates the latter with a step by step movement, and as each piece of the stock or material is carried around to a position in alinement with the opening $m$ of the carrier L, the cam E' operates the lever O for moving the carrier L close to the feeder I. The stud S on the carrier is made to enter one of the openings $k$ of the feeder, for the purpose of locking said feeder against further rotation, and the same movement of the carrier L presses the members M into engagement with one piece of stock or material, to likewise hold the stock in place on the feeder during the operation of cutting the stock by the cutters on the two spindles B, C. The cutter spindle B is now moved by the slide F, which is acted on by the cam E through the lever F, so as to present one cutter to the stock or material which is held in the feeder and by the gripper devices. The cutter of the spindle B operates to trim, fashion, or cut the stock or material on one face thereof, and at the proper time the cam E operates the lever F', so as to shift the slide F in a direction which will withdraw the cutter of the spindle B from the material, and at the same time advance the cutter on the spindle C into position to operate on the other side of the stock or material. As previously described, the cutter of the spindle C operates on the back and edge of the button, so as to complete the work which is to be done on the material by the present machine, and when this cutting operation shall have been completed, the button blank is discharged through the opening in the housing H, and the opening P, in the machine frame. The cam E now operates to reverse the bar F, and the spindles B, C, and, in the meantime, the cams E', E², operate the carrier L, and the feeder I, so as to place the parts in position for feeding the next piece of stock or material, which is to be subsequently treated to produce a complete button blank therefrom.

Changes in the form, size, proportion, and minor details in construction may be made without departing from the spirit of the invention or sacrificing any of the advantages thereof, and I, therefore, reserve the right to make such alterations and modifications as fairly fall within the scope of my invention.

Having thus described my invention, what I claim as new, and desire to secure by Letters Patent is:—

1. In a machine of the class described, rotatable means for feeding button-stock to a button-cutting mechanism, a relatively stationary button-stock retaining member adjacent to said rotatable means, and stock gripping mechanism supported independently of said rotatable means, said stock-gripping mechanism and said retaining member being adapted to coöperate with said rotatable means for holding button-stock during its treatment by the cutting mechanism.

2. In a machine of the class described, a rotatable button-stock feeder, a relatively stationary retaining member adjacent to said stock-feeder, a stock-gripper movable sidewise with respect to said rotatable feeder, and means for imparting said sidewise movement to the stock-gripper relative to the rotatable feeder, said stock-gripper and said retaining member coöperating with said rotatable feeder for holding button-stock during the operation of cutting mechanism thereon.

3. In a machine of the class described, a relatively stationary retaining member, a stock gripper adjacent thereto, and a rotatable feeder positioned for operation intermediate said retaining member and the stock-gripper, the stock-gripper and the retaining member coöperating with said rotatable feeder for holding button-stock during the operation of cutting mechanism thereon.

4. In a machine of the class described, a stock-retaining member, a rotatable feeder adjacent thereto, and a stock-gripper supported independently of, and movable sidewise with respect to, said rotatable feeder, said rotatable feeder being positioned for operation intermediate said retaining member and the stock-gripper, and being rotatable relatively thereto.

5. In a machine of the class described, a stock-retaining member, a stock feeder rotatable with respect to said retaining member, means for intermittently operating said stock feeder, and a stock-gripper adapted to coöperate with the retaining member and the stock feeder in holding button-stock during the operation of cutting mechanism thereon.

6. In a machine of the class described, a stock-retaining member, a stock feeder rotatable with respect to said retaining member, a stock-gripper movable sidewise with respect to the stock feeder and adapted to coöperate with said stock feeder and the retaining member in holding button-stock during the operation of cutting mechanism thereon, and means for intermittently operating the stock-gripper to impart said sidewise movement thereto.

7. In a machine of the class described, a stock retaining member, a stock feeder rotatable with respect to said retaining member, means for intermittently operating said stock feeder, a stock-gripper movable sidewise with respect to the stock feeder and adapted to coöperate with the retaining member and the stock feeder in holding button-stock during the operation of cutting mechanism thereon, and means for intermittently operating the stock-gripper to impart said sidewise motion thereto.

8. In a machine of the class described, rotatable means for feeding button-stock to a button cutting mechanism, a gripper carrier supported separately from said rotatable feed means, said gripper carrier being movable sidewise with respect to said feed means and a plurality of stock-gripping members mounted on said gripper carrier for movement therewith relative to said feed means, said stock-gripping members being adapted for coöperation with the stock feeding means in retaining button-stock in position for operation by the cutting mechanism.

9. In a machine of the class described, a rotatable feeder adapted to supply button-stock to a cutting mechanism, a gripper carrier supported independently of said rotatable feeder, said gripper carrier being movable sidewise with respect to said rotatable feeder, locking mechanism for retaining the rotatable feeder at rest, said locking mechanism being operated by the sidewise movement of the gripper carrier whereby the rotatable feeder is locked and released, a plurality of gripper members mounted in the gripper carrier for movement therewith, and stock retaining means coöperating with said stock gripping means.

10. In a machine of the class described, a rotatable stock feeder, a stock-gripper supported independently of said feeder and movable sidewise with respect thereto, stock retaining means in coöperative relation to the stock gripper, means for giving a step by step motion to said feeder, and means operated by the sidewise movement of said stock-gripper for locking said rotatable feeder in the intervals between the feed motion imparted to said stock feeder.

11. In a machine of the class described, a rotatable stock feeder, means for intermittently imparting motion thereto, stock retaining means, a gripper carrier supported independently of said stock feeder and movable sidewise with respect thereto, a plurality of grippers mounted on the gripper carrier for movement therewith with respect to the stock feeder, said gripper carrier, the grippers thereon and the stock retaining means being adapted to coöperate with said stock feeder in retaining button-stock in position for operation by cutting mechanism, and means for imparting sidewise motion to the gripper carrier and the grippers.

12. In a machine of the class described, a stock feeder, a gripper carrier supported independently of the stock feeder and movable sidewise with respect thereto, a plurality of grippers yieldingly mounted on the gripper carrier for movement therewith relative to the stock feeder and stock retaining means, said gripper carrier and the grippers being movable into coöperative relation to the stock retaining means and the stock feeder for retaining button-stock in position during the operation of cutting mechanism thereon.

13. In a machine of the class described, a revoluble feeder provided with a plurality of peripheral pockets into which button blanks are adapted to be introduced directly, a gripper carrier supported independently of, and movable sidewise with respect to, said feeder, means for moving said gripper carrier sidewise with respect to the rotatable feeder, a plurality of yieldable grippers mounted in said gripper carrier and movable thereby into coöperative relation to the revoluble feeder, and stock retaining means adapted to coöperate with the aforesaid stock gripping means.

14. In a machine of the class described, a rotatable feeder provided with peripheral pockets into which button blanks are adapted to be introduced directly, a gripper carrier movable sidewise with respect to said feeder, gripper devices on said gripper carrier, means for operating the gripper carrier to impart sidewise motion thereto, and stock retaining means adapted to coöperate with the aforesaid stock gripping mechanism, said gripper carrier and the gripper devices being supported independently of the rotatable feeder.

15. In a machine of the class described, a revoluble feeder provided with peripheral pockets into which the button blanks are adapted to be introduced directly, a gripper carrier supported independently of the feeder and movable into coöperative relation to said feeder, means for moving the gripper carrier sidewise with respect to the feeder, a plurality of spring actuated gripper devices on the gripper carrier, and stock retaining means coöperating with the gripper mechanism.

16. In a machine of the class described, a rotatable feeder provided with peripheral pockets into which the button blanks are adapted to be introduced directly, combined with a stock-gripper consisting of an apertured carrier-plate, a group of members on said carrier around a button receiving aperture therein, and means for holding said members yieldingly on the carrier.

17. In a machine of the class described, a revoluble feeder provided with peripheral pockets into which the button blanks are adapted to be directly introduced, a stock gripper having yieldable members and supported independently of said feeder for movement sidewise relative thereto, means for yieldingly holding the gripper carrier in one position, means for positively moving the carrier in opposition to the holding means, and stock retaining means coöperating with the stock gripper.

18. In a machine of the class described, a revoluble feeder, a stock-gripper pivotally supported independently of said feeder and adapted for movement sidewise with respect thereto, a spring acting on the gripper, a cam-actuated lever adapted to move the gripper in opposition to the spring, said feeder being rotatable with respect to said stock-gripper, and stock retaining means coöperating with the stock gripper.

19. In a machine of the class described, a housing, a feeder revolubly mounted in the housing, a stock-gripper movable sidewise with respect to the feeder, and separate means for actuating the feeder and the stock-gripper, said housing and the stock-gripper being adapted to coöperate with the feeder in retaining button stock in position for operation thereupon by suitable cutting mechanism.

20. In a button making machine, a rotatable stock feeder, stock retaining means, and stock gripping means coöperating with the stock retaining means, said stock gripping and stock retaining means being supported independently of the stock feeder.

21. In a button making machine, stock retaining means, stock gripping means coöperating with said stock retaining means, and a stock feeder rotatable with respect to said stock gripping and stock retaining mechanisms.

In testimony whereof I have signed my name to this specification in the presence of two subscribing witnesses.

ALBENO CHARLES JONES.

Witnesses:
ERNEST G. GAULY,
WILLIS M. ROBERTS.